US007487258B2

(12) United States Patent
Eilam et al.

(10) Patent No.: US 7,487,258 B2
(45) Date of Patent: Feb. 3, 2009

(54) ARBITRATION IN A COMPUTING UTILITY SYSTEM

(75) Inventors: Tamar Eilam, New York, NY (US); Guerney D. H. Hunt, Yorktown Heights, NY (US); Sandra D. Miller, Winchester (GB); Lily B. Mummert, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 740 days.

(21) Appl. No.: 10/866,946

(22) Filed: Jun. 14, 2004

(65) Prior Publication Data

US 2005/0198641 A1   Sep. 8, 2005

Related U.S. Application Data

(63) Continuation-in-part of application No. PCT/US2004/002741, filed on Jan. 30, 2004, and a continuation-in-part of application No. PCT/US2004/002696, filed on Jan. 30, 2004, and a continuation-in-part of application No. PCT/US2004/002637, filed on Jan. 30, 2004.

(51) Int. Cl.
*G06F 15/16* (2006.01)

(52) U.S. Cl. .................. 709/238; 709/239; 709/240; 711/147; 370/237

(58) Field of Classification Search ........... 709/220, 709/226, 228, 240, 238, 239; 711/147; 370/237; 713/100
See application file for complete search history.

(56) References Cited

U.S. PATENT DOCUMENTS

| 6,104,998 | A | * | 8/2000 | Galand et al. ............... 704/500 |
| 6,167,445 | A | * | 12/2000 | Gai et al. ..................... 709/223 |
| 6,873,147 | B2 | * | 3/2005 | Ahrikencheikh ......... 324/158.1 |
| 7,225,271 | B1 | * | 5/2007 | DiBiasio et al. ............. 709/240 |
| 7,230,924 | B2 | * | 6/2007 | Chiu et al. ................... 370/237 |
| 7,269,696 | B2 | * | 9/2007 | Muhlestein et al. ......... 711/147 |
| 7,376,755 | B2 | * | 5/2008 | Pandya ....................... 709/250 |
| 2004/0263152 | A1 | * | 12/2004 | Ahrikencheikh ......... 324/158.1 |

* cited by examiner

*Primary Examiner*—Khanh Dinh
(74) *Attorney, Agent, or Firm*—Vazken Alexanian (57) ABSTRACT

Methods, apparatus and systems for controlling allocation and de-allocation of resources in a computing utility system, and evaluating resource assignments. Resources are dynamically allocated to customers of the computing utility through computing environments in such a way that a given objective is satisfied. Assignment of resources to environments is affected by relationships between computing environments which enable resource sharing, and constraints regarding assignment of resources to environment which limit resource sharing. The invention may be used over all of the environments in the utility or a selectable subset.

29 Claims, 8 Drawing Sheets

ARBITRATION IN A COMPUTING UTILITY SYSTEM

PRIORITY AND CROSS REFERENCES

The present application is a continuation-in part, CIP, of International Application Serial No.: PCT/US2004/02741, filed Jan. 30, 2004; and a continuation-in part of international application entitled "Hierarchical Resource Management for a Computing Utility", filed Jan. 30, 2004, assigned International Application Number, PCT/US2004/002696; and a continuation-in part of international application entitled "Componentized Automatic Provisioning and Management of Computing Environments for Computing Utilities", filed Jan. 30, 2004, assigned International Application Number, PCT/US2004/002637. All these three priority documents are incorporated herein by reference in entirety for all purposes.

FIELD OF THE INVENTION

The present invention is directed to providing computing resources of a distributed computing system to multiple customers on demand. It is more particularly directed to provide arbitration for resource allocation in a computing utility.

BACKGROUND OF THE INVENTION

A hosting center provides computing services to multiple customers. Each customer is allocated a subset of the service provider's infrastructure resources, such as servers, to meet its needs. Customer needs change over time, and in particular, peak demands for resources can exceed average demands by orders of magnitude. A simple static allocation of resources to satisfy peak demand leaves resources underutilized. Thus recent work has focused on dynamic resource allocation in hosting environments. One of the issues in dynamic allocation schemes is resolving competing demands for resources. Solutions include first-come-first-served, priority based schemes, economic or revenue-based models, and minimization of the likelihood of missing SLAs. In all of these examples, the resources being allocated are servers. Progress has been made on dynamic allocation of other resource types, and exploring tradeoffs between certain resource types.

The general problem for a service provider is, given sets of heterogeneous resources which may be dynamically allocated to customers, what is the best way to allocate them? Because the time it takes to allocate, provision, and configure a resource for each customer varies, it is important to generate good allocations. This problem can be reduced to an optimization problem which may be evaluated with objective functions such as the ones enumerated above.

A computing utility is a system that provisions and manages one or more computing services on a shared resource infrastructure. Such a system may be used by a service provider to provide computing services to its customers using the resources in its hosting center infrastructure. A resource allocation mechanism is a basic component of a computing utility system.

SUMMARY OF THE INVENTION

In accordance with the aforementioned need, one aspect of the present invention provides methods, systems and apparatus for dynamic resource allocation in a computing utility system.

Thus, the present invention provides methods, apparatus and systems for controlling allocation and de-allocation of resources in a computing utility system, and evaluating resource assignments. Resources are dynamically allocated to customers of the computing utility through computing environments in such a way that a given objective is satisfied. Assignment of resources to environments is affected by relationships between computing environments which enable resource sharing, and constraints regarding assignment of resources to environment which limit resource sharing. The invention may be used over all of the environments in the utility or a selectable subset.

In an example embodiment, a method is provided for controlling allocation and de-allocation of resources. The method comprising dynamically allocating resources to said at least one customer having at least one computing environment in a computing utility system in such a way to satisfy a given objective function, the step of dynamically allocating comprising: obtaining a representation of the relationships between said at least one computing environment provided by the computing utility; and a representation of constraints regarding assignment of said at least one resource; determining a time period over which said at least one resource is to be allocated; employing an algorithm which satisfies the objective function subject to the constraints in obtaining a set of assignments of resources to said at least one computing environment; selecting a particular assignment from the set of assignments satisfying an assignment selection criterion; and implementing the particular assignment of said at least one resource to said at least one computing environment.

Also provided, is an example of a method for evaluating a customer assignment of at least one resource to at least one computing environment. The method comprising: obtaining data from the customer including: customer assignment; the customer resources, the customer computing environments, the customer resource constraints, the customer computing environment relationships; running an algorithm upon said customer data, obtaining at least one candidate assignment of said at least one resource to said at least one computing environment; comparing said at least one candidate assignment to the customer assignment; and providing an evaluation of the customer assignment and said at least one candidate assignment to the customer.

BRIEF DESCRIPTION OF THE DRAWINGS

These, and further, aspects, advantages, and features of the invention will be more apparent from the following detailed description of a preferred embodiment and the appended drawings wherein.

DETAILED DESCRIPTION OF THE INVENTION

The present invention provides methods, apparatus and systems for an arbiter which provides dynamic resource allocation for a computing utility. The invention is directed to a basic instrumentality of infrastructure on demand. The invention provides methods, apparatus and systems for controlling allocation and de-allocation of resources in a computing utility system, and evaluating resource assignments. Resources are dynamically allocated to customers of the computing utility through computing environments in such a way that a given objective is satisfied. Assignment of resources to environments is affected by relationships between computing environments which enable resource sharing, and constraints regarding assignment of resources to environment which limit resource sharing.

Thus, the present invention provides methods and apparatus for dynamic resource allocation in a computing utility system. These systems generally, but not necessarily, have one or more characteristics listed below. Together, these characteristics generalize the environments studied in previous works.

First, resources may be allocated to customers in combinations which are heterogeneous, may be interdependent, and vary over time.

Second, the services provided to each customer may be different. For example, one customer may be provided resources for a web site, and another for a scientific computing cluster. Resource types, quantities, dependencies, and allocation patterns will thus vary between customers.

Third, the level of service provided to each customer may be different. This means that evaluating the quality of a resource allocation to a customer takes into account both the type and level of service.

Fourth, the resource infrastructure itself may vary over time. These variations can be a result of upgrades or additions to the physical infrastructure, engaging the services of another provider, or inclusion of additional resources when idle or at certain times of day.

Fifth, resources may be allocated in advance, or reserved. A reservation may be accepted even if there are not sufficient resources currently available in the infrastructure to fulfill it, based on the expectation that additional resources will be acquired in time for allocation.

Sixth, customers may want to subdivide their allocations and have the service provider manage the subdivided allocations, such as to departments.

Seventh, customers may want to supply resources which they currently own to be managed by the service provider, which can only be used for their purposes. This requirement imposes constraints on where resources may be allocated.

Finally, different service providers may have different objectives in mind when allocating resources to customers, such as maximizing profit, availability, or performance. This invention assumes a single objective, but is able to accommodate different ones.

Figure 1:
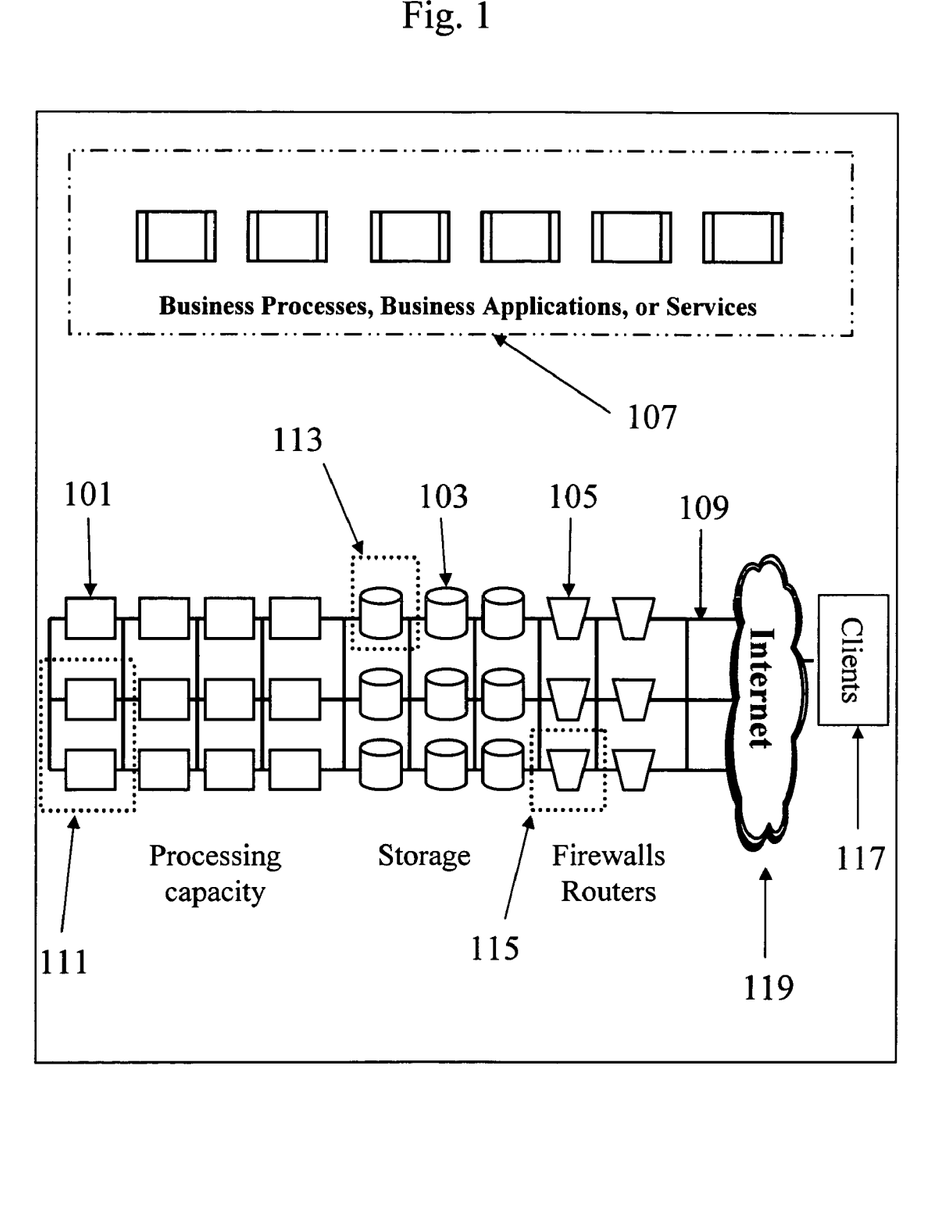
FIG. 1 shows an exemplary hosting center, the system in which the present invention is used.

The system in which the present invention is generally used, is a distributed computer system which has multiple computing resources interconnected via a network. A diagram of such a system, which would be found in a hosting or data center, is shown in FIG. 1. The computing resources in the physical infrastructure include processors 101, storage 103, firewalls 105, and software 107. The software can be operating systems, middleware or applications. In FIG. 1 the available software has been preconfigured into business processes, business applications, or services. The hardware resources are connected by a network 109 as indicated by the grid of lines interconnecting all of these resources. This network may be configure into one or more tiers, where each tier is separated by a router or firewall. Software resources are assigned to physical resources by a management infrastructure. In this environment a subset of the resources are assigned to the management infrastructure. In FIG. 1 these resources 111, 113, and 115 are indicated by a dotted line surrounding them. The resources assigned to the management infrastructure run the management software described in this invention. This software manages the rest of the resources. The resources used for the management infrastructure are not assigned to customers of the hosted environment. The remaining resources are assigned to customers as necessary. It is expected that customers 117 will primarily receive service by connecting to their resources through the Internet 119. However, customers can receive service if they are connected to their resources by any means, such as through a direct connection to a managed resource.

Figure 2:
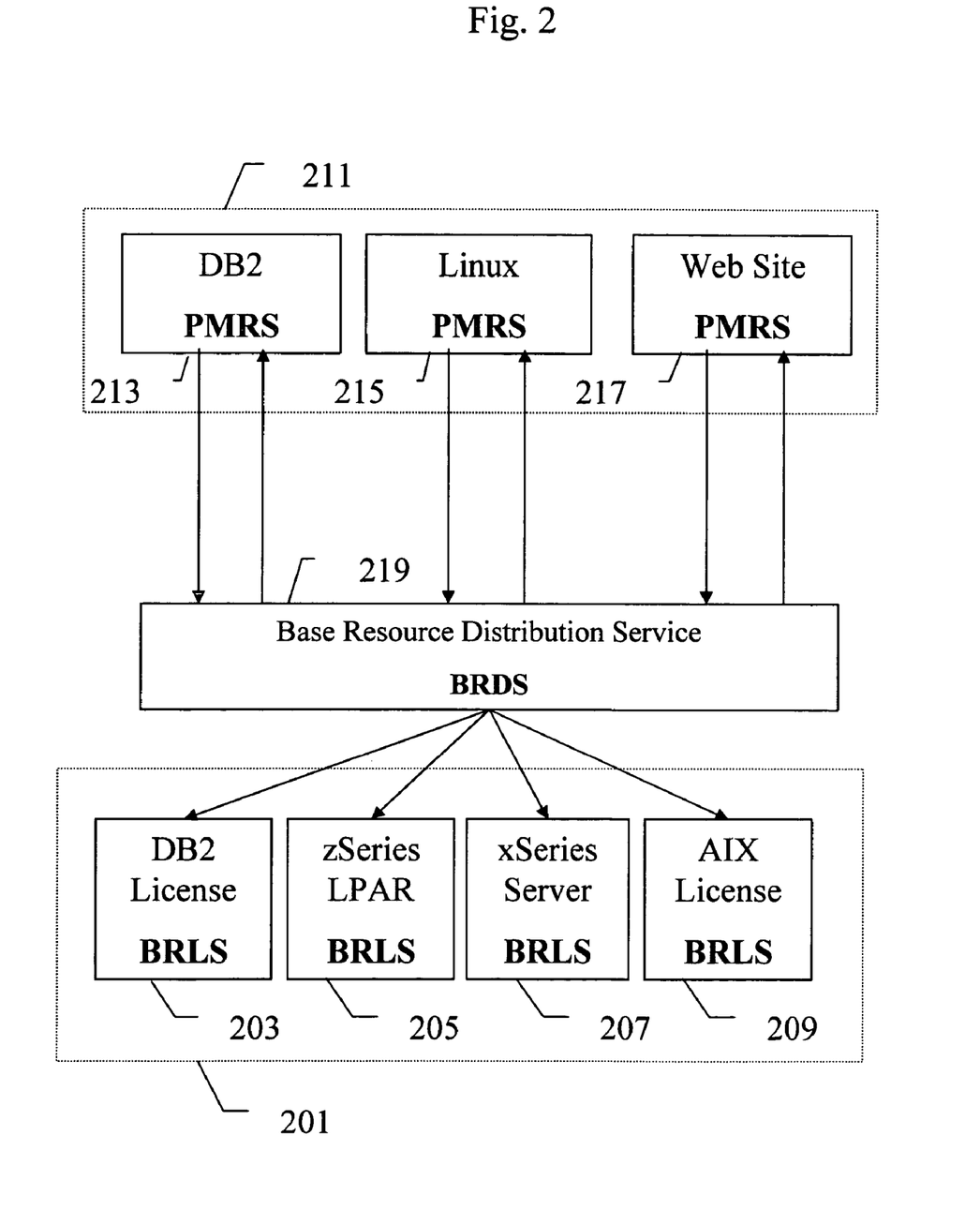
FIG. 2 shows components in a computing utility management system.

FIG. 2 shows a high level view of a computing utility. There are three layers of components. The bottom layer 201 represents the resources of the hosting center available to customers. A base resource is a resource that is atomic; it cannot be broken down into other resources. Adding, removing, or modifying a base resource changes the overall capacity of the system. This invention assumes that both the number and types of the base resources change over time. Base resources are represented by a set of Base Resource Library Services (BRLS). FIG. 2 shows four types of base resources and their BRLSs: DB2 software licenses 203, zSeries logical partitions 205, xSeries server hardware 207, and AIX licenses 209. The BRLS provides information such as cataloging, check out (allocation), check in (deallocation), and reservation.

A composite resource is built out of other resources to perform a specified function. A composite resource may have a set of dependencies associated with it. An example of a composite resource is a web site. It may be composed of some number of front-end servers, back end servers, a load balancer, a set of IP addresses for the servers, web server software, database software, and licenses associated with the software. The set of base resources used to implement the function of a composite resource can change over time, though not all composite resources may have this capability.

A computing environment is a computing service provided to a customer. It includes hardware and software resources such as servers, operating systems, and middleware. The computing environment is a type of composite resource. This invention assumes that the resources allocated to a computing environment are dedicated to that computing environment for the duration of their allocation. Associated with each computing environment is software that provisions and manages the resources used to provide the computing environment, called the Provisioned and Managed Resource Services (PMRS). Every resource type, including composite resources, has a PMRS which encapsulates the knowledge of how to create a resource of that type, and how to manage an instance of the resource. Provisioning refers to the act of allocating a resource to a computing environment and configuring it for use within the computing environment. Provisioning actions may include assembling base resources into composites, configuring network devices, installing operating systems, application software, monitors, and user accounts. Managing the resource may include such actions as requests for adding or removing capacity from the resource instance. In FIG. 2, the top layer 211 shows the computing environments and their PMRSs. FIG. 2 shows three examples of computing environments, a DB2 environment 213, a Linux environment 215, and a Web site environment 217.s.

The middle layer of FIG. 2 is the Base Resource Distribution Service (BRDS) 219. Its job is to allocate the resources of the service provider to its computing environments in an effective way, based on the agreements that the service provider has in force for each of its computing environments. It interacts with both the computing environments (PMRS) and resources (BRLS). A resource may be allocated to a computing environment either immediately or in the future. The promise of a future resource allocation is a reservation.

Figure 3:
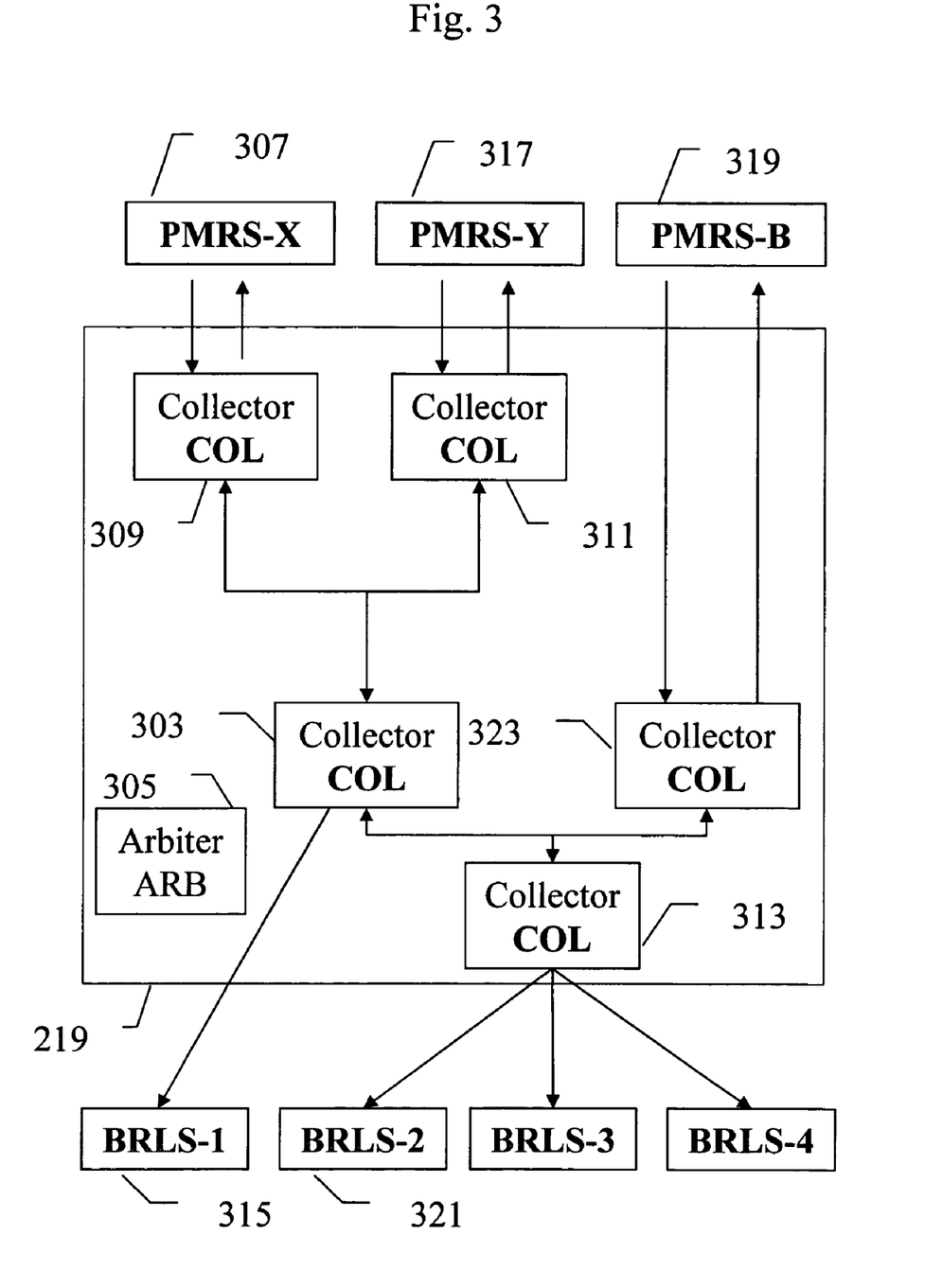
FIG. 3 shows an example of components of a resource distribution component of the computing utility system.

FIG. 3 shows an example of detail on the BRDS 219. It includes of two types of components, Collectors 303, 309, 311, 313, 323 and an Arbiter 305. A collector represents the set of resources allocated to one or more computing environments. Each computing environment 307 has an associated collector 309. Collectors may be arranged in a tree to enable resource sharing between a subset of computing environments, essentially replicating the computing utility model for those computing environments. This hierarchical structure establishes relationships for the purpose of resource sharing between computing environments. For example, this structure may represent departments 309 and 311 within an organization 303. The root of the tree is called the root collector 313.

The arbiter 305 determines how resources are divided amongst computing environments. The arbiter operates both on current and future allocations (reservations). Resources may be allocated to computing environments either reactively or proactively. The arbiter can be consulted when free resources are not sufficient to fulfill demands from customer computing environments. It can also be used on a periodic basis to optimize resource allocations. If resources are constrained, the arbiter may reclaim resources from computing environments.

Figure 4:
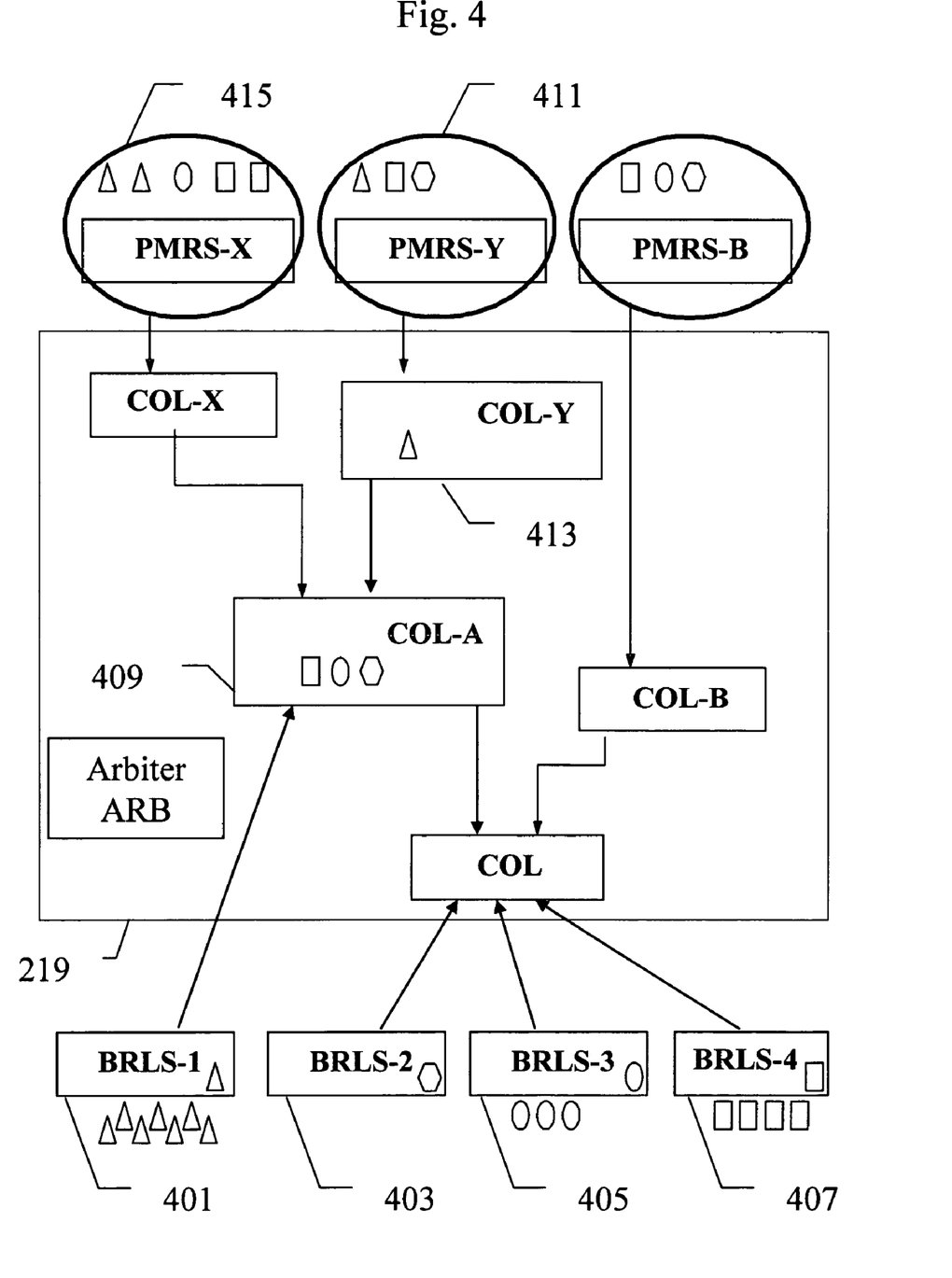
FIG. 4 shows an example of the association of resource pools to collections.

FIG. 4 shows an example of how resources may be associated with collectors. Each BRLS 401 403 405 and 407 represents a resource pool of a particular type. Resource pools may be public or private. A public resource pool is a resource pool from which any computing environment may allocate a resource. A private resource pool is restricted to a subset of customer computing environments. Private pools are used to dedicate resources to a subset of customer computing environments. For example, a private pool could house resources for use in multiple computing environments on behalf of a single customer. Such a pool might also be used for resources the customer owns but wishes the service provider to manage for it. Every resource has a home pool from which it originates, which may be either public or private. The home pool does not change when a resource is allocated or reserved.

The association of BRLS with a collector defines the scope of sharing for the resource pool. For example, if an organization wishes to have a private resource pool for its departments, it would associate a BRLS with the collector of the organization. The servers would be available for allocation only by customer computing environments associated with the organization (i.e., associated with a collection manger that has the organization as a common ancestor). A BRLS associated with a root collector is a public resource pool. FIG. 4 shows three public resource pools 403 405 and 407, and one private resource pool 401 for company A 409. The triangle inside of 401 indicates what type of resources are distributed by this BRLS and the triangles below BRLS 401 indicate available resources. This invention describes a BRDS with a single root collector and a single arbiter. The extension to multiple roots is achieved by partitioning the resource pools and associating a BRLS for each partition with distinct root collectors. An arbiter may be associated with one or more root collectors. A root collector is associated with exactly one arbiter.

FIG. 4 also shows resources residing in collectors and computing environments. The resources allocated to a computing environment 411 are recorded in their associated collector 413. This is denoted by the circle around the PMRS and the arrow pointing to the collector 411. In addition to resources active within a computing environment, there may be resources which are allocated from their home pools but not currently active within a computing environment residing at a collector. This is shown in FIG. 4 by the shapes in COL-A 409 and COL-Y 413. These resources are available for allocation to computing environments X 415 and Y 411. All the resources of BRLS 403 have been distributed into the utility. Note that in all cases, the resources allocated to computing environments or collectors may represent current allocations or reservations.

Because the services provided to each customer may be different, the invention is able to evaluate the condition of a computing environment in a normalized way. A computing environment utility function expresses the performance of the computing environment relative to its service objective. It is used to evaluate a resource allocation for a computing environment, predict the value of allocations over time, and predict the effect of adding or removing different combinations of resources. Note that to make these predictions the computing environment utility function should encapsulate the resource dependencies within a computing environment. Such functions exist, for example, for web services with static content that encompasses memory and storage allocation. In some cases, the computing environment utility function is structured internally as a set of modules providing short and long term forecasting.

Similarly, the service provider is able to evaluate a collection of computing environments together. The service provider utility function expresses the performance of the service provider's resources as applied to computing environments. It is a function of allocated resources (represented by computing environment utility functions), and unallocated resources. It reflects, either implicitly or explicitly, the relative importance of each computing environment. For example, the service provider utility function could take the utility for each computing environment, express each in terms of revenue based on contractual agreements, and output the sum. A simple priority for each customer can be used to weight the utility of each computing environment. It can also take into account other service provider costs such as energy and express the service provider utility as profit.

Figure 5:
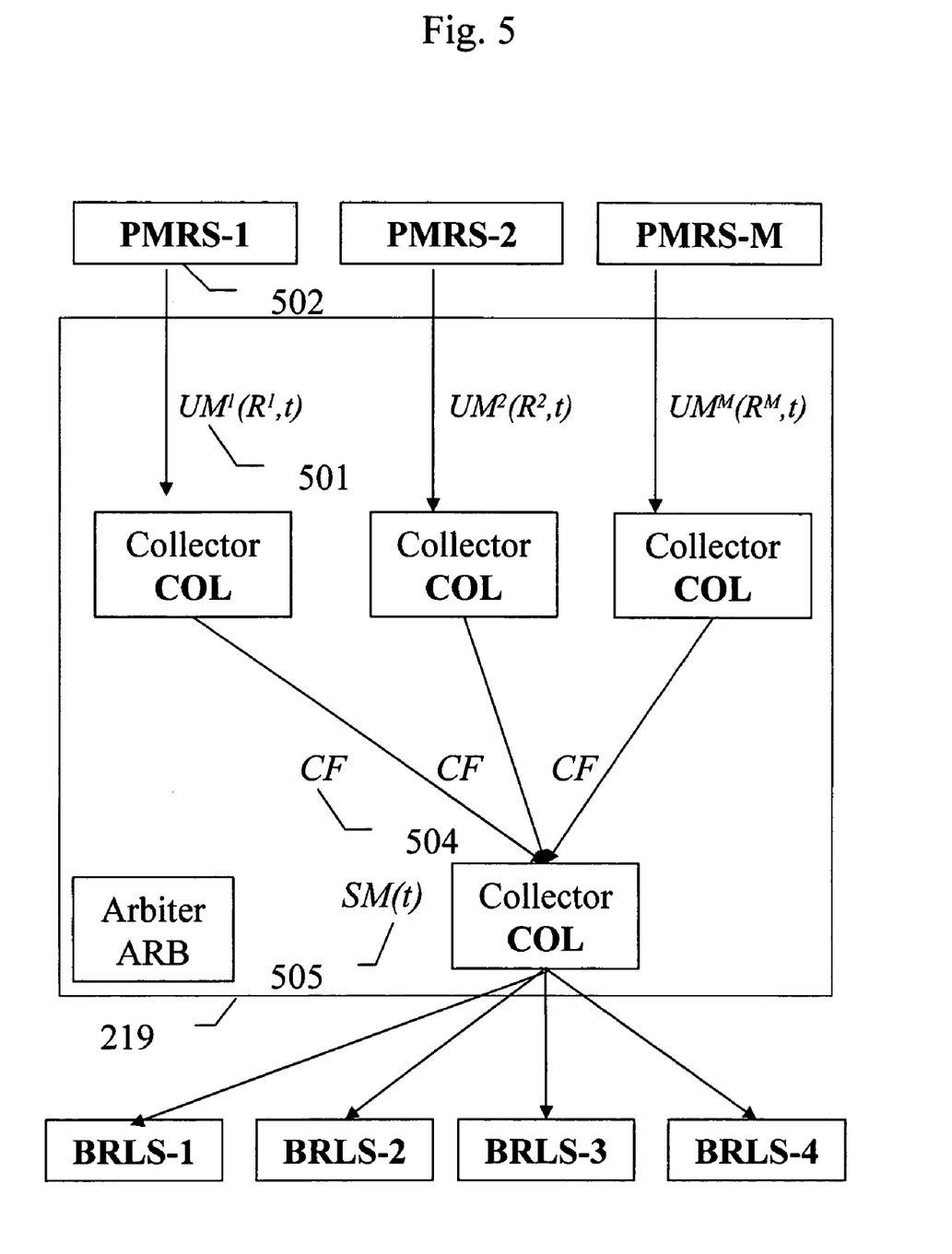
FIG. 5 shows an example of how a service provider evaluates its objective function for a flat collection hierarchy.

FIG. 5 shows an example of how the utility functions fit within the system of the invention. The computing environment utility function UM 501 is encapsulated within the PMRS for its computing environment 502. The BRDS 219 obtains the values of the computing environment utility functions and combines them using a function CF 504 to derive the service provider utility function SM 505.

Arbitration takes place over a common set of units for all computing environments and resources. These "coins of the realm" are the base resources, which are the building blocks of the system. The arbiter uses the utility functions described above to make resource allocation decisions between computing environments. As mentioned above, assignment of resource instances to computing environments may be constrained by instances in private resource pools. In this sense, the collectors set the context for arbitration, and this context defines the resources which are available for distribution.

The arbiter uses an optimization algorithm to solve the problem formulated below.

Problem Formulation

Let N be the number of resource types, and let t represent time, divided into discrete periods.

Let $CP_i(t)$ denotes the capacity, in number of instances, of resource type i at time t, $1 \leq i \leq N$. The capacity of each resource type is a function of time in order to take into account changes to the infrastructure, such as planned upgrades, resource failures, and engagements with other service providers.

Let M be the number of customer computing environments, and $D^x$ represent computing environment $1 \leq x \leq M$. Each computing environment has an associated start time and end time, which represents the period during which resources are allocated to the computing environment. For computing environments which recur in time (i.e., have phased behavior), a new computing environment is instantiated for each time period. The start time for computing environment x is denoted $t^x_{start}$ and $t^x_{end}$. Note that a structure representing the computing environment is created before its start time to record the commitments made on behalf of that computing environment, such as resource reservations. This invention assumes that a computing environment instance is created upon agreement between customer and service provider, and is populated with resource reservation information and other state when appropriate.

Let $R^x$ represent the resources assigned to computing environment x, $1 \leq x \leq M$. $R^x = (r^x_1, r^x_2, \ldots r^x_N)$, where $r^x_i$ is the number of resources of type i allocated to computing environment x. A resource assignment can refer to a current allocation or reservation state.

Let $UM^x$ be the utility function for computing environment x, $1 \leq x \leq M$. The computing environment utility function expresses the performance of the computing environment relative to its service level objectives as a normalized scalar value. The output of UM is projected onto the range $[-1,+1]$, where 0 means service level objectives are being met exactly, a positive value means service exceeds objectives, and a negative value means service is not meeting objectives.

For resource vector R and time t, $UM^x(R, t)=0$ for all R if $t<t^x_{start}$ or $t>t^x_{end}$. This means that for computing environment x, the utility function output is 0 if the time is prior to the computing environment start time or after the computing environment end time.

Utility functions may have a horizon beyond which they cannot make predictions. For example, a utility function may only be able to make reasonable predictions for the next hour. The output of a utility function for times beyond the horizon is undefined.

Let CF represent a combining function, which is an associative function whose inputs are one or more computing environment utility values. Examples of a combining function include sum or weighted sum. The function must be associative because it is used to combine subsets of computing environments which are represented by a hierarchy of collectors.

Figure 6:
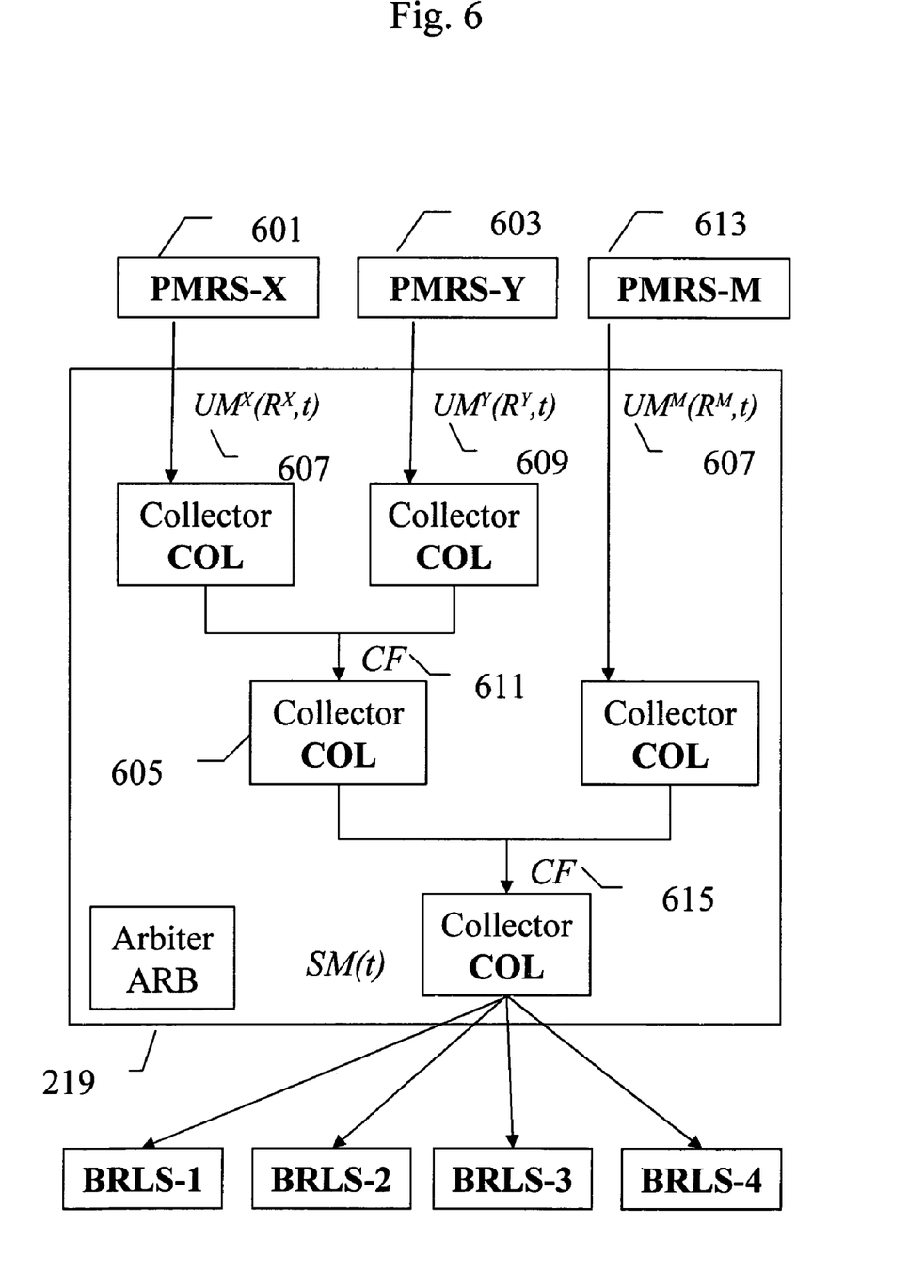
FIG. 6 shows how a service provider evaluates its objective function for a collection hierarchy which includes in intermediate collection point.

Let SM represent the system utility function, which computes the system utility for a set of resource vectors $R^x$, $1 \leq x \leq M$, at time t as $SM(t)=CF(UM^1(R^1, t), UM^2(R^2, t), \ldots UM^M(R^M, t))$ for a flat computing environment collection hierarchy, as shown in FIG. 5. For a hierarchy of collectors, SM is composed according to a tree structure, for example as shown in FIG. 6.

Computing environments X 601 and Y 603 are grouped under a collector 605. In this example, the utility function for computing environment X 607 and computing environment Y 609 are first combined using combining function CF 611. This value is then combined with the utility function value for computing environment M 613 using combining function 615. Thus SM is computed in FIG. 6 as $CF(CF(UM^X(R^X, t), UM^Y(R^Y, t)), \ldots UM^M(R^M, t))$. Generally SM can be computed using a depth-first tree traversal in which the utility values are propagated from leaf nodes (computing environments) to the root of the collector hierarchy accumulated by CF.

SM may also be function of unallocated resources, because they may have costs or other characteristics that are taken into account. In such a case, unallocated resources may be modeled as customer computing environments which have low importance, and high utility. Resources in this computing environment have low yield, and therefore would be subject to reassignment. The yield of a resource refers to its value within a computing environment for some period of time. It can be calculated as the difference between the computing environment utility including the resource and the computing environment utility excluding the resource.

Two types of constraints affect the assignment of resources to computing environments. The first concerns libraries and their associations with collectors. The resources represented by a BRLS are available only to its associated collector and descendants. For example, in FIG. 3, an instance from BRLS-1 315 can be assigned to computing environment X 307 or Y 317, but not to computing environment B 319. Resource instances in BRLS-2 321 can be assigned to any computing environment. The second type of constraint, called acquisition policy (defined in the application having docket number YOR920030587US1) is a constraint on the resources that may be assigned to a collector and its descendants. In the formulation below, the predicate valid_assignment(w, D, t) is true if the BRLS containing resource instance w is associated with the collector for computing environment D or an ancestor of the collector for computing environment D, and if the acquisition policies of the collector for D and its ancestors are satisfied at time t. If the predicate is true, resource instance w can be assigned to computing environment D at time t.

Figure 7:
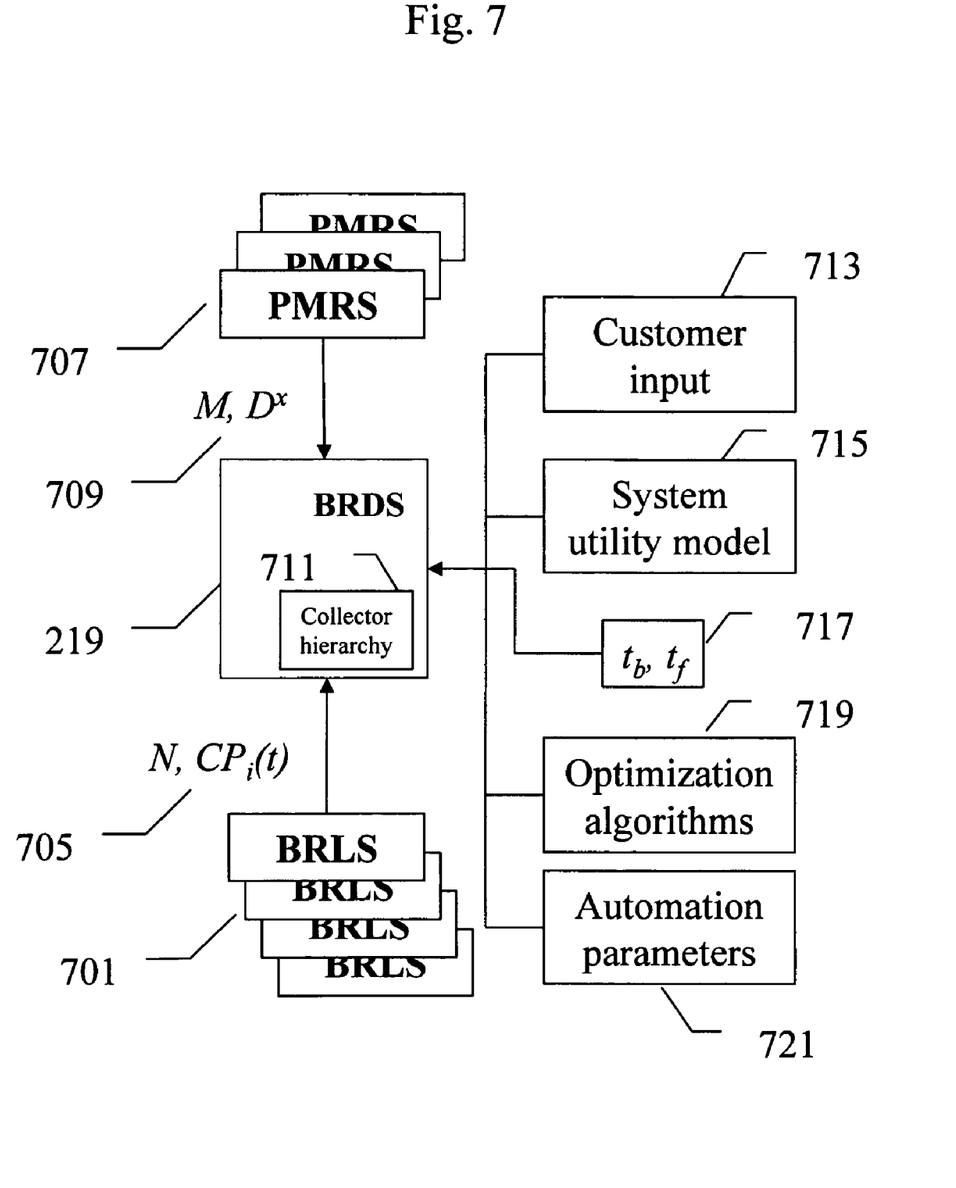
FIG. 7 shows system inputs used by arbitration.

The service provider objective is then to find an assignment of resource instances to computing environments that maximizes system utility over a given time interval. If the time interval starts at $t_b$ and finishes at $t_f$, the objective is:

maximize $SM(t)$, $t_b \leq t \leq t_f$
subject to $r^x_i \leq CP_i(t)$,
and valid_assignment(w, $D^x$, t), for all w in $R^x$, and t assigned
where $1 \leq x \leq M$
$1 \leq i \leq N$
$t_b \leq t \leq t_f$ FIG. 7 shows an example of the sources of the inputs in the formulation above to the BRDS for arbitration. From the BRLSs 701 the BRDS 219 obtains the inputs 705 the number of resource types N and resource capacities $CP_i(t)$. From the PMRSs 707 the BRDS 219 obtains inputs 709 number of computing environments M, and the computing environment information $D^x$, which includes the computing environment start time $t^x_{start}$, computing environment end time $t^x_{end}$, and the utility function $UM^x$ provided as part of the PMRS for the computing environment. The BRDS 219 encompasses the collector hierarchy 711, which is established on customer input 713. Since customers may be added during the operation of the utility, the collector hierarchy can change during run time, but may be considered fixed for the duration of any single arbitration. Collector information includes the acquisition policies, associations with BRLSs, and resource allocations. For arbitration, the BRDS also receives as input $t_b$, $t_f$, 717, system utility model SM 715, and one or more optimization algorithms 719. Recall that the definition of SM is in terms of CF. Finally, the BRDS receives a set of automation parameters 721 that define which actions, if any, need human interaction for approval. Generally, the human is an administrator or system operator of the service provider.

Utility Functions

The system utility function may be changed during operation of the system to reflect changes in service provider objectives. For example, the service provider may wish to optimize both profit and customer satisfaction. If the service provider has profit as its only objective, it may shortchange an important customer who has an agreement involving volume discounts. It is the responsibility of the service provider to select objectives that are compatible enough to ensure consistent treatment of customers when objectives change.

The system and computing environment utility functions may be modified during operation to reduce predictive error. Log data may be used to modify the predictions issued by the computing environment utility function, or to change combining function weights to give a poor predictive model less influence. This invention assumes that the utility functions are valid. The solution to the validation problem is beyond the scope of this invention.

Arbitration Scope

Arbitration may be called on a subset of the computing environments served by the computing utility, as described in the application application Ser. No. 10/587,618. The scope of the arbitration refers to a node in the collector hierarchy that serves as the root node for the arbitration. This node is an interior node with more than one child. Selection of this node determines the computing environments over which arbitration will occur, the set of resources available for arbitration, and the nature of the utility function.

Evaluation of the utility function given an arbitration scope can be described semi-formally by the following recursive procedure, for a node in the collector hierarchy C, time period beginning at t, and combining function CF with an initial value of CF_INITIAL, EvaluateUtility (C, t):

```
1. Let theUtility = CF_INITIAL
2. For every node N which is a child of C
      If N is leaf node then
            Let D^i = computing environment associated with C
            theUtility = CF(theUtility, UM^i(R^i, t))
      else
            theUtility = CF(theUtility, EvaluateUtility(N, t))
3. Return theUtility
```

SM(t) is computed by calling EvaluateUtility with the root node of the collection hierarchy. CF_INITIAL is a neutral initial value given a particular CF, such as 0 for a sum, or 1 for a multiplicative function.

The arbitration scope determines the available set of resources $CP_i(t)$. The resources available include resource pools associated with collectors in scope, and already allocated or reserved resources associated with interior nodes. Referring to FIG. 4, if the scope is set to the root collector, arbitration occurs over all computing environments and includes all resources. If the scope is set to collector COL-A, arbitration occurs over computing environments X and Y, and includes the resources in private pool BRLS-1 and resources residing in COL-Y and COL-A. The resources associated with COL-Y and COL-A have reservation times which may or may not overlap with the start and end times of arbitration. The following pseudo-code shows how to construct $CP_i(t)$ given the node in the collector hierarchy that is the root of the arbitration.

setCapacity (coll):

```
1. Initialize CPi(t) to 0, for all i, 1 ≤ i ≤ N; and all t, t_b ≤ t ≤ t_f
2. For every collector node N in the subtree rooted at coll
      a. For every BRLS L associated with N
            Let i = resource type identifier of L, 1 ≤ i ≤ N.
            For every time period t in t_b ≤ t ≤ t_f
                  CP_i(t) += number of instances in L at time t
      b. For every resource instance w associated with N
            Let wHome be the BRLS that the home collection of w.
            If wHome is not associated with a collector in scope
                  Let i = resource type identifier of w, 1 ≤ i ≤ N.
                  Let t_s, t_e be the start time and end times of the reservation
                  for w
                  For every time period t in max(t_b, t_s) ≤ t ≤ min(t_f, t_e)
                        CP_i(t) += 1
```

To determine if a resource instance may be assigned to a computing environment, the home collection of the instance is associated with its collector or one of its ancestors. The following pseudo-code indicates whether a resource instance w may be assigned to computing environment D.

isAssignable (w,D):

```
1. Let wHome be the BRLS that the home collection of w.
2. Let C be the leaf collector associated with D.
3. Let N = C.
4. Do
      If wHome is associated with N
            return true
      else if N is the root collector
            return false
      else
            Let N = parent collector of N
```

Second, the acquisition policies must allow the assignment at time t. The acquisition policy for a collector applies to resources associated with it and all of its descendants, including those assigned to computing environments (which implicitly are associated with their leaf collectors). The following pseudo-code indicates whether the assignment of resource instance w to computing environment D at time t is acceptable given the acquisition policies in force.

isAcquirable (w, D, t):

```
I.   Let C be the leaf collector associated with D.
II.  Let N = C.
III. Do
        If assigning w to D at time t would violate the acquisition
        policy of N
              Return false
        Else if N is the root of the arbitration
              Return true
        Else
              Let N = parent collector of N
```

Then the predicate valid_assignment(w, D, t) is established as isAssignable(w,D) && isAcquirable(w,D,t).

Operation of the Apparatus

Figure 8:
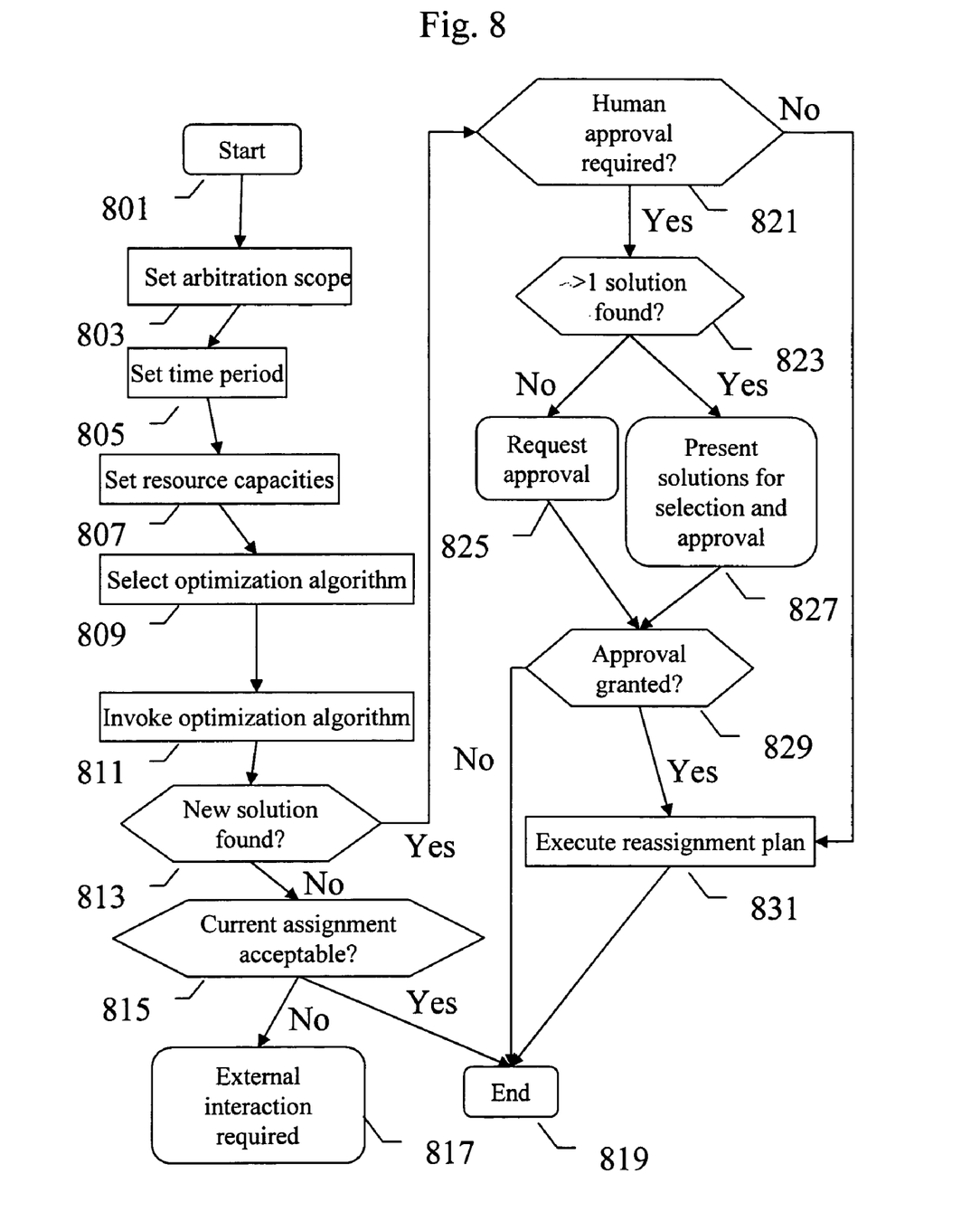
FIG. 8 shows an operation of the invention.

An example of the operation of the apparatus is shown in FIG. 8. Starting in step 801, the apparatus first enters the input phase. In step 803 it sets the scope of the arbitration. The scope determines the computing environments involved in the arbitration. Next in step 805 the start and end time of the arbitration is set. Next in step 807 the resource capacities are set using procedure setCapacity described above. If more than one optimization algorithm is defined for the system, step 809 selects one. It is expected that different optimizations algorithms will be used in different contexts. For example, if arbitration is invoked to resolve an immediate resource shortage, a fast solution may be more important than an optimal one. For periodic optimization conducted off-line, the reverse may be true. There exist optimization algorithms for combinatorial problems that can trade off solution accuracy and solution time. This property may be provided by a single algorithm, such as an imprecise algorithm or any-dimensional algorithm, or by a set of algorithms used in combination, such as a fast heuristic algorithm and a slower optimal algorithm.

In step 811, the apparatus enters a planning phase in which it uses the optimization algorithm to optimize the service provider objective function for the collectors in scope, using the procedure EvaluateUtility defined above. The following alternatives are available for exploring assignments. Except for the final alternative, rejecting a resource request, they can be explored alone or in combination.

Modify a resource request. If the arbiter is called as a result of a resource request, options are a modification in time or a modification in space. A modification in time is an adjustment for the time of the resources requested to a time they are available (e.g., postponing the start time of a reservation). A modification in space is an adjustment of the set of resources requested. A computing environment may be able to accept different combinations of resources either directly (e.g., a different brand of server and operating system), or by making tradeoffs internally (e.g., memory for hard disk storage).

Modify the allocations of one or more computing environments. Again, these modifications can occur in time or space. Allocations of other computing environments may be modified only if they are within the scope of arbitration, and the assignment of resources is valid.

Reject the request.

Each assignment generated by the optimization algorithm is checked against the constraints of the problem, including the valid_assignment predicate defined above. The output of the optimization algorithm, if any, is one or more valid assignments that improve the utility of the collectors in scope. This output is checked in step 813. If no solution is found and the current assignment is acceptable in step 815, the procedure ends with step 819. The current assignment is the set of allocations and reservations that are presently in force. If no solution is found in step 813 and the current assignment is not acceptable in step 815, the procedure exits with a request for external intervention in step 817.

If one or more solutions are found, the procedure enters the reassignment phase in step 821. First it checks if human approval is required (i.e., if reassignment is automated). If approval is required, it then checks the number of solutions that were generated in step 823. If exactly one solution was found, and human approval is required from step 821, the procedure presents the solution for approval in step 825. If more than one solution was generated, the procedure presents the solutions for selection and approval in step 827. The selection is based on an assignment selection criterion. Criteria include such items as: assignment utility value, number of changes required, assignment cost, resource characteristics, resource availability, service provider preference; and customer preference. If a solution is not approved, the procedure ends in step 819.

If a solution is approved in step 829, or if human approval is not required in step 821, control passes to step 831, in which the BRDS executes a reassignment plan including of a set of operational recommendations to adjust current allocation or reservation state. These operational recommendations are issued using the allocation operations described in the cross referenced application Ser. No. 10/587,618. If resources are to be removed from one or more computing environments, the BRDS issues reclaim requests to those computing environments. If resources are to be added to computing environments, the BRDS issues offer requests to those computing environments. If the computing environment accepts the offer, it will respond with a resource request for the resources offered. The procedure then ends in step 819.

Thus, this invention provides a method for managing and controlling allocation and de-allocation of resources. The method comprising dynamically allocating resources to the at least one customer having at least one computing environment in a computing utility system in such a way to satisfy a given objective function. The step of dynamically allocating comprising: obtaining a representation of the relationships between the at least one computing environment provided by the computing utility; and a representation of constraints regarding assignment of the at least one resource; determining a time period over which the at least one resource is to be allocated; employing an algorithm which satisfies the objective function subject to the constraints in obtaining a set of assignments of resources to the at least one computing environment; selecting a particular assignment from the set of assignments satisfying an assignment selection criterion; and implementing the particular assignment of the at least one resource to the at least one computing environment.

In some embodiments of the method, the step of obtaining includes at least one step taken from a group of steps including: forming the representation of relationships between computing environments based on input given upon creation of each of the at least one a computing environment, and forming the constraints from associations of resources which may be assigned to particular computing environments from said at least one computing environment, and from associations of functions specifying the types and quantities of said at least one resource to said at least one computing environment; and/or the step of determining includes receiving an input having start and end times over which particular resources from said at least one resource is to be allocated to said at least one computing environment; and/or the step of employing includes the steps of:

selecting a particular algorithm from a set of algorithms satisfying an algorithm selection criterion; and executing the particular algorithm.

In some embodiments of the method, the step of implementing includes the steps of comparing the particular assignment to the current assignment; creating a reassignment plan having any requests to reclaim resources assigned to computing environments in the current assignment that do not appear in the particular assignment, and any requests to offer resources to computing environments that appear in the particular assignment but not in the current assignment; and executing the reassignment plan.

In some embodiments of the method, the way to satisfy a given objective function is taken from a group of ways including maximizing the objective function; minimizing the objective function; approximating the maximum value of the objective function; and approximating the minimum value of the objective function.

Some embodiments of the method further comprise repeating the steps of obtaining, determining, employing, selecting, and implementing in accordance with a repetition criterion, the repetition criterion is taken from a group of repetition criteria including: periodic repetition; on occurrence of a resource shortage; upon addition of a computing environment; upon removal of a computing environment; upon changes in the relationships between computing environments; upon addition of a customer; upon removal of a customer; upon changes in at least one utility function; upon changes in a combining function; upon changes in the constraints; upon addition of a resource type; upon removal of a resource type; upon changes in the quantity of at least one resource types; and any combination of the repetition criteria.

This invention also provides a method for evaluating a customer assignment of at least one resource to at least one computing environment, the method comprising: obtaining data from the customer including: customer assignment; the customer resources, the customer computing environments, the customer resource constraints, the customer computing environment relationships; running an algorithm upon the customer data, obtaining at least one candidate assignment of said at least one resource to said at least one computing environment; comparing said at least one candidate assignment to the customer assignment; and providing an evaluation of the customer assignment and said at least one candidate assignment to the customer.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. A method for controlling allocation and de-allocation of resources, said method comprising dynamically allocating computing resources of a distributed computing system on demand to at least one customer from a multiple of customers having at least one computing environment in a computing utility system in such a way to satisfy a given objective function, said step of dynamically allocating comprising:
    obtaining a representation of the relationships between said at least one computing environment provided by the computing utility; and a representation of constraints regarding assignment of said at least one resource;
    determining a time period over which said at least one resource is to be allocated;
    employing an algorithm which satisfies the objective function subject to said constraints in obtaining a set of assignments of resources to said at least one computing environment;
    selecting a particular assignment from said set of assignments satisfying an assignment selection criterion; and
    implementing the particular assignment of said at least one resource to said at least one computing environment.

2. A method as recited in claim 1, wherein the step of obtaining includes at least one step taken from a group of steps including:
    forming said representation of relationships between computing environments based on input given upon creation of each of said at least one a computing environment; and forming said constraints from associations of resources which may be assigned to particular computing environments from said at least one computing environment, and from associations of functions specifying the types and quantities of said at least one resource to said at least one computing environment.

3. A method as recited in claim 1, wherein the step of determining includes receiving an input having start and end times over which particular resources from said at least one resource is to be allocated to said at least one computing environment, said computing environment being a hosting environment.

4. A method as recited in claim 1, wherein the step of employing includes the steps of:
    selecting a particular algorithm from a set of algorithms satisfying an algorithm selection criterion; and executing said particular algorithm.

5. A method as recited in claim 1, wherein the step of selecting includes the steps of:
   determining if human approval is required; and
   if human approval is required, presenting said set of assignments for selection and approval by a human.

6. A method as recited in claim 1, wherein the step of implementing includes the steps of:
   comparing said particular assignment to the cunent assignment;
   creating a reassignment plan having any requests to reclaim resources assigned to computing environments in said cunent assignment that do not appear in said particular assignment, and any
   requests to offer resources to computing environments that appear in said particular assignment but not in said cunent assignment; and
   executing said reassignment plan.

7. A method as recited in claim 1, wherein the assignment selection criterion is taken from a group of criteria including:
   assignment utility value;
   number of changes required;
   assignment cost;
   resource characteristics;
   resource availability;
   service provider preference;
   customer preference; and
   any combination of these criteria.

8. A method as recited in claim 1, wherein the way to satisfy a given objective function is taken from a group of ways including:
   maximizing the objective function;
   minimizing the objective function;
   approximating the maximum value of the objective function;
   approximating the minimum value of the objective function; and
   any combination of these ways.

9. A method as recited in claim 1, wherein the objective function is an associative combination of utility functions in accordance with the relationships between computing environments, wherein each utility function in the combination is taken from each said at least one environment.

10. A method as recited in claim 1, wherein the step of implementing the particular assignment comprises providing a first set of resources to a first computing environment, and providing a subsequent set of resources to a subsequent computing environment.

11. A method as recited in claim 1, wherein the step of implementing the particular assignment comprises providing a first set of resources to a first computing environment, and providing a subsequent set of resources to a subsequent computing environment.

12. A method as recited in claim 11, wherein the first set of resources differs from the subsequent set of resources in at least one of type and amount.

13. A method as recited in claim 11, wherein the first computing environment differs from the subsequent computing environment in computing services provided.

14. A method as recited in claim 1, wherein the particular assignment of said at least one resource to said at least one computing environment is provided for use at a designated time.

15. A method as recited in claim 1, wherein the particular assignment of resources includes resources taken from a group of resources including:
   heterogeneous resources;
   interdependent resources,
   resources that vary over time; and
   any combination of these resources.

16. A method as recited in claim 9, wherein said utility functions incorporate an amount of resources provided to said at least one computing environment at a service level specified in a service level agreement with each customer from said at least one customer.

17. A method as recited in claim 1, further comprising repeating the steps of obtaining, determining, employing, selecting, and implementing in accordance with a repetition criterion, said repetition criterion is taken from a group of repetition criteria including:
   periodic repetition;
   on occurrence of a resource shortage;
   upon addition of a computing environment;
   upon removal of a computing environment;
   upon changes in said relationships between computing environments;
   upon addition of a customer;
   upon removal of a customer;
   upon changes in at least one utility function;
   upon changes in a combining function;
   upon changes in said constraints;
   upon addition of a resource type;
   upon removal of a resource type;
   upon changes in the quantity of at least one resource types; and any combination of said repetition criteria.

18. A method as recited in claim 1, wherein said at least one resource includes resources which are taken from a resource infrastructure that varies over time.

19. A method as recited in claim 18, wherein said resource infrastructure changes in a manner taken from a group of resource infrastructures changes consisting of:
   upgrades or additions to the physical infrastructure;
   engaging the services of another provider;
   inclusion of additional resources when idle or at certain times of day; and
   any combination of these changes.

20. A method as recited in claim 1, wherein the relationships between computing environments represent a customer with multiple departments sharing a set of resources collectively.

21. A method as recited in claim 1, wherein the constraints regarding assignment of said at least one resource represent a set of resources supplied by a customer for use in only those computing environments provided to said customer.

22. A method as recited in claim 4, wherein the algorithm selection criterion is taken from a group of criteria including:
   solution accuracy;
   solution time; and
   any combination of these criteria.

23. A program storage device readable by machine, tangibly embodying a program of instructions executable by the machine to perform method steps for managing and controlling allocation and de-allocation of resources, said method steps comprising the steps of claim 1.

24. A method for evaluating a customer assignment of at least one resource to at least one computing environment, said method comprising:
   obtaining data from said customer including: customer assignment; said customer resources, said customer computing environments, said customer resource constraints, said customer computing environment relationships;
   running an algorithm upon said customer data, obtaining at least one candidate assignment of said at least one resource to said at least one computing environment;

comparing said at least one candidate assignment to said customer assignment; and providing an evaluation of said customer assignment and said at least one candidate assignment to said customer.

25. A program storage device readable by machine, tangibly embodying a program of instructions executable by the machine to perform method steps for evaluating a customer assignment of at least one resource to at least one computing environment, said method steps comprising the steps of claim 1.

26. An apparatus providing the functions of the steps in claim 1.

27. An apparatus to manage and control allocation and de-allocation of resources, said apparatus comprising:

a hosting center to provide at least one resource for at least one computing environment, said hosting center having computing resources dedicated to managing said at least one resource provided to said at least one computing environment;

a memory device having a representation of each resource of said at least one resource, a representation of each computing environment of said at least one computing environment, a representation of relationships between computing environments from said at least one computing environment, a representation of constraints regarding assignment of each of said at least one resource, an algorithm to produce at least one assignment of resources that satisfies an objective function subject to said constraints, a time period over which said at least one resource is to be allocated;

a processor to run said algorithm to obtain a set of assignments of resources to said at least one computing environment;

a selection module to select a particular assignment from said at least one assignment satisfying an assignment selection criterion; and a reassignment module to implement the particular assignment of said at least one resource to said at least one computing environment, thereby dynamically allocating said at least one resource to said at least one computing environment in the computing utility system in such a way to satisfy the objective function.

28. A computer program product comprising a computer storage medium having computer readable program code means embodied therein for causing dynamically allocation of at least one resource to at least one computing environment in a computing utility system, the computer readable program code means in said computer program product comprising computer readable program code means for causing a computer to effect:

a hosting center to provide at least one resource for at least one computing environment, said hosting center having computing resources dedicated to managing said at least one resource provided to said at least one computing environment;

a memory device having a representation of each resource of said at least one resource, a representation of each computing environment of said at least one computing environment, a representation of relationships between computing environments from said at least one computing environment, a representation of constraints regarding assignment of each of said at least one resource, an algorithm to produce at least one assignment of resources that satisfies an objective function subject to said constraints, a time period over which said at least one resource is to be allocated;

a processor to run said algorithm to obtain a set of assignments of resources to said at least one computing environment; a selection module to select a particular assignment from said at least one assignment satisfying an assignment selection criterion; and a reassignment module to implement the particular assignment of said at least one resource to said at least one computing environment, thereby dynamically allocating said at least one resource to said at least one computing environment in the computing utility system in such a way to satisfy the objective function.

29. A program storage device readable by machine, tangibly embodying a program of instructions executable by the machine to perform method steps for evaluating a customer assignment of at least one resource to at least one computing environment, said method steps comprising the steps of claim 24.

* * * * *